350-3.62 SR

XR 3,720,921

United States [11] 3,720,921

Schools et al. [45] March 13, 1973

[54] RECORDING IN REVERSIBLE, PHOTOCHROMIC MEDIUM

[75] Inventors: Rodman S. Schools, Poughkeepsie; Glenn T. Sincerbox, Wappingers Falls, both of N.Y.

[73] Assignee: International Business Machines Corporation, Armonk, N.Y.

[22] Filed: July 14, 1970

[21] Appl. No.: 56,219

Related U.S. Application Data

[63] Continuation of Ser. No. 517,597, Dec. 30, 1965, abandoned.

[52] U.S. Cl....340/173 LM, 340/173 CC, 350/160 P

[51] Int. Cl. ............................................G11c 13/04

[58] Field of Search...340/173 LM, 173 CC, 173 LS; 350/160 P

[56] References Cited

UNITED STATES PATENTS

| | | | |
|---|---|---|---|
| 3,296,594 | 1/1967 | Van Hurden | 340/173 |
| 3,387,140 | 6/1968 | Roth | 340/173 |
| 3,417,381 | 12/1968 | Sincerbox | 340/173 |

*Primary Examiner*—Terrell W. Fears
*Attorney*—Wray and Aisenberg

[57] ABSTRACT

Interfering radiations of substantially coherent electromagnetic radiation of a wave length within a range to which a layer of photochromic material is sensitive are transmitted in different directions through a layer of the material in selected regions. The interfering radiations in each region produce antinodes which form peak energy levels to sensitize the photochromic material in spaced, parallel surfaces of a periodic structure having altered transmission and reflective properties.

The sensitized regions constituting the recorded information may be read by radiation of a lower energy level or of a wave length outside the range of sensitivity directed to the regions, the reflected radiation being detected to represent the recorded information.

A plurality of interfering beams may be transmitted in different directions in the same region to produce different recordings and may be detected by the same radiations.

The photochromic material may be restored to its original state by radiation of a wave length in a third range, so that such radiation may be used to erase recording in any region.

8 Claims, 4 Drawing Figures

3720921
OR IN 340/173LM

*INVENTORS*
RODMAN S. SCHOOLS
GLENN T. SINCERBOX

BY Littlepage & Quaintance
*ATTORNEYS*

RECORDING IN REVERSIBLE, PHOTOCHROMIC MEDIUM

This application is a continuation of Ser. No. 517,597, filed Dec. 30, 1965 and now abandoned.

This invention relates to recording information in material sensitive to electromagnetic radiation.

Photochromic material has the property of reversibility, i.e., it may be restored to its original state after being modified by radiation and may be used to record information, and to read out and erase the recorded information. Certain materials are sensitive to light only in a narrow band of frequencies and can be read by light in another band to which the material is insensitive. The material is reversed or restored to its original condition by radiation of another wave length band.

This invention resides in recording in a photochromic medium with a wave length in the sensitive band and in reading or sensing the recorded information with a radiation to which the medium is insensitive, either because of its low energy or because it lies in the non-sensitive band. The information may be erased and the medium restored to its original state by radiation of a third wave length band.

It is the principal object of this invention to record information, whether in the form of binary bits, graphic patterns, images or other physical representations, by creating standing waves of electromagnetic radiation in a reversible, photochromic medium sensitive to the radiation to modify the medium in the points of peak energy of the standing waves of the radiation and to read out the information by applying electromagnetic radiation of a low energy level or a wave length to which the medium is insensitive, the applied radiation being altered by the changes in the medium to sense the recorded information.

Numerous materials are known which exhibit the phenomenon of photochromic change of color on exposure to light. Proceedings of a symposium on this subject were published in the Journal of Physical Chemistry, 66 (December, 1962), and a list of many photochromic substances were printed in Review of Pure Applied Chemistry, 11, 1 (1961) by G. H. Brown and W. G. Shaw. Some of these materials are known as Kalvar, spiropyrons, color center materials, and various photochromic glasses.

This invention contemplates the application of the principle of interference of electromagnetic radiation to produce optical changes in a photochromic medium sensitive to the radiation, in a manner analogous to the Lippmann process as applied to a photographic emulsion. In that process, stationary waves are formed by interference of light waves to produce loci of peak energy level in the emulsion, and thereby form reflective particles in surfaces corresponding to the antinodes of the interfering radiation. In this invention, the peak energy level at loci in a photochromic medium is formed by interference of monochromatic electromagnetic radiation, so that the photochromic medium is altered at such loci in equally spaced parallel surfaces to exhibit a change in light reflective properties. These surfaces form a periodic structure in the medium which may be sensed by radiation of a wave length to which the medium is insensitive so that the information may be read out.

The foregoing and other objects, features and advantages of the present invention will be apparent from the following more particular description of the preferred embodiment of the invention as illustrated in the accompanying drawings.

Figure 1:
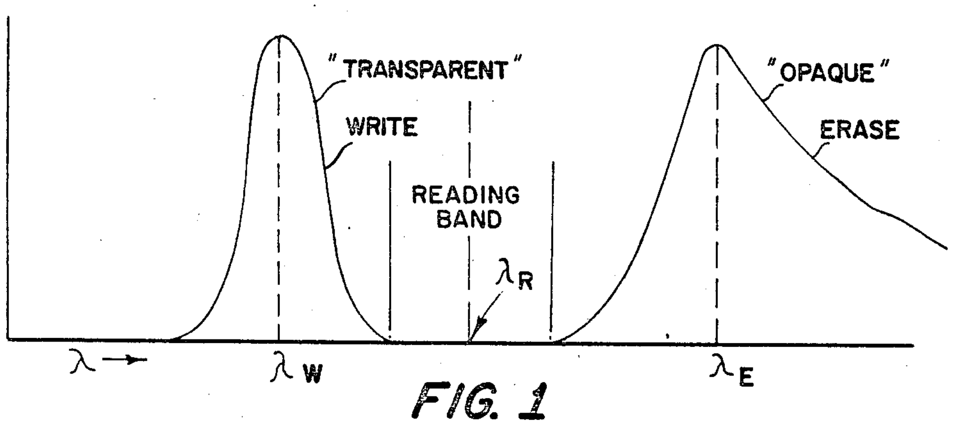
FIG. 1 shows how the curve of sensitivity of a photochromic medium appears.

The graph in FIG. 1 illustrates diagrammatically how the sensitivity of one photochromic material would be useful for recording. This material has a sensitivity to radiation of wave length $\lambda_w$, which is used to record in the medium, the sensitivity being indicated by the ordinate for a given range of wave lengths along the abscissa. In the reading band, radiation of wave length $\lambda_R$ is used to sense the information, and at another wavelength $\lambda_E$ the medium is sensitive to radiation, as indicated by the ordinate of the curve, which restores the medium to its original state and erases the information. The radiation of wave length $\lambda_w$ may change the color of the medium, so that radiation of $\lambda_R$ will provide for reading the information.

A certain threshold level is required to modify the recording medium for the change in its light transmitting property. It is possible, in some materials, to use a radiation of the same wave length but below the threshold level to read out the information.

Figure 2:
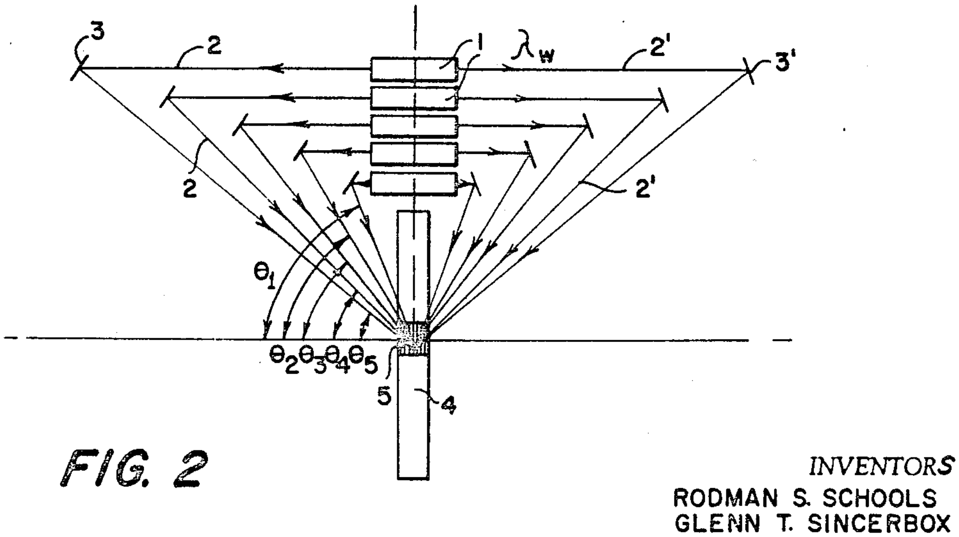
FIG. 2 shows a form of recording by interfering radiation in a photochromic medium.

FIG. 2 illustrates the application of the invention to a material which is sensitive to radiation in the short wave length or ultraviolet end of the spectrum. Two beams, 2, 2' are produced by a source 1 of monochromatic light having a wave length $\lambda_w$. These two beams may be produced either by a wave filter and beam splitter, or by a laser. The two beams are reflected by mirrors 3, 3' to the photochromic recording medium 4. Interference between the two beams causes standing waves 5 within the film 4, forming peak energy levels at the antinodes. At each of these antinodes, the peak energy causes the medium to change in light reflective property, the loci of these changes defining a series of surfaces in the photochromic medium to form a periodic structure. These surfaces in the periodic structure will reflect radiation of an appropriate wave length so that information may be read out.

A plurality of periodic structures may be formed in the single region, as illustrated in FIG. 2, by using interfering radiation at different angles to the film to form periodic structures. For this purpose, a plurality of light sources 1 are shown, with the two beams 2, 2' from each source at a different angle from those of the other beams. A single source may be used in this system by changing the direction of the radiation with each recording.

The interference between two beams of radiation each at an angle $\theta_\beta$ to the film normal produces a standing wave in the medium of wave length $\lambda_\beta=\lambda_{w/\cos}\ \theta_\beta$. As shown in FIG. 2, a plurality of beams at angles $\theta_1$, $\theta_2$, $\theta_3$, etc., form standing waves of wave length $\lambda_1=\lambda_{w/\cos}\ \theta_1$, $\lambda_2=\lambda_{w/\cos}\ \theta_2$, $\lambda_3=\lambda_{w/\cos}\ \theta_3$, etc. In this manner, a number of periodic structures of surfaces of light reflective material are formed, with separation of the surfaces in each structure by $\lambda_{1/2}$, $\lambda_{2/2}$, $\lambda_{3/2}$, etc.

Figure 3:
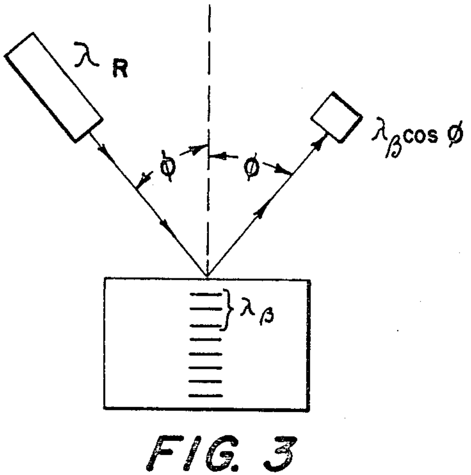
FIG. 3 illustrates the principle of reading out the information recorded.
Figure 4:
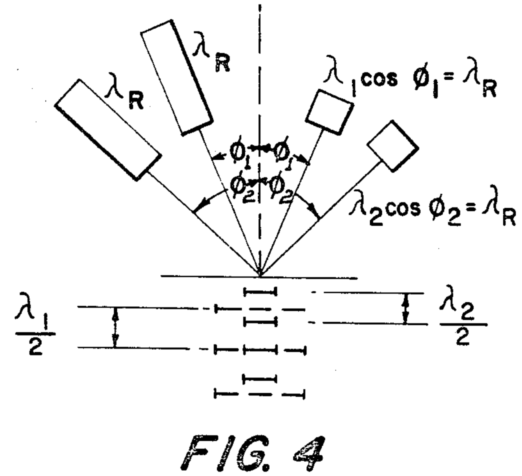
FIG. 4 shows how information is read out in a film having several recordings.

The information may be read out by radiation $\lambda_R=\lambda_\beta \cos \phi$, (see FIG. 3) with sufficient range of wave length such that $\lambda_R=\lambda_1 \cos \phi_1$, $\lambda_R=\lambda_2 \cos \phi_2$, $\lambda_R=\lambda_3 \cos \phi_3$, etc., as illustrated in FIG. 4.

If the region in FIG. 2 represents one bit for each recording operation, a plurality of bits may be recorded in each region, and the recording radiation may be applied selectively to each region in the medium.

In one application of the principle of this invention, the photochromic medium may be photochromic glass known as Type AR produced by Corning Glass Company. A source of monochromatic light of 4880 A may be used for writing in the manner shown in FIG. 2. A Helium-Neon laser may furnish the longer wave length radiation of 6328 A necessary to read the information, as shown in FIG. 4.

When erasure of information is desired, radiation of a wave length in the "Opaque" band, such as $\lambda_E$ illustrated in FIG. 1, is applied to the recording medium. The recording in any one region may be obliterated in this manner, or the entire medium may be erased.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system of recording information in selected regions of a recording medium comprising a layer of reversible, photochromic material which is sensitive to alteration of its radiation transmission and reflection properties by electromagnetic radiation of a wave length within a first range and above a certain energy level, and is insensitive to radiation of a wave length within a second range, means to transmit a pair of beams of substantially coherent monochromatic electromagnetic radiation within said first range below said certain energy level in different directions through the opposite sides of said layer in a single region of said medium so as to form standing waves of interfering radiation through said layer in said region, the peak energy level of the antinodes of said interfering standing waves being above said certain energy level to alter said transmission and reflection properties of said medium in parallel, spaced surfaces through said layer, so that said pair of interfering radiations forms a periodic structure in said region of said layer.

2. A system as claimed in claim 1, and means for reflecting radiation within said second range from said medium to read the recorded information.

3. A system of recording information selectively in selected regions of a recording medium comprising a layer of reversible, photochromic material which is sensitive to alteration of its radiation transmission and reflection properties by electromagnetic radiation of a wave length in a first range and above a certain energy level and is insensitive to radiation of a wave length in a second range, means to transmit substantially coherent electromagnetic radiations within said first range and below said certain energy level in different directions through said layer to alter said properties of said material in selected regions to represent recorded information by producing interfering radiations through said layer in said regions, the antinodes of said radiations forming peak energy levels above said certain energy level within said first range, and means to read the information recorded in said selected regions by radiation of a wave length in said second range.

4. A system as claimed in claim 3, and means to restore said medium to its original state by exposing said medium to radiation of a wave length in a third range.

5. A system of recording information in selected regions of a recording medium comprising a layer of reversible, photochromic material which is sensitive to alteration of its radiation transmission and reflection properties by electromagnetic radiation of a wave length within a first range and above a certain energy level, and is insensitive to radiation of a wave length within a second range, means to transmit a plurality of pairs of beams of substantially coherent monochromatic electromagnetic radiation within said first range and below said certain energy level in different directions through the opposite sides of said layer in a single region of said medium so that each pair forms standing waves of interfering radiation through said layer in said region, the peak energy level of the antinodes of said standing waves being above said certain energy level to alter said transmission and reflection properties of said medium in parallel, spaced surfaces through said layer, so that each pair of interfering radiations forms a periodic structure in said region of said layer.

6. A system as claimed in claim 5, and means to reflect radiation within said second range from the several structures to sense the recorded information, and means to sense the reflected radiation according to the direction of the recording radiation.

7. A system as claimed in claim 5, in which means are provided to transmit a plurality of pairs of interfering beams through said layer within a region to form a plurality of periodic structures of spaced surfaces through said layer, and said means to direct a beam of a wave length within said second range to any of said regions produces reflections from each of said periodic structures.

8. A system of recording information in selected regions of a recording medium comprising a layer of reversible, photochromic material which is sensitive to alteration of its radiation and reflection properties by electromagnetic radiation of a wave length within a first range and above a certain energy level, is insensitive to radiation of a wave length within a second range and is sensitive to radiation of a wave length within a third range to reverse the effect of radiation within said first range and to restore the material to its original sensitivity as unaffected by radiation, means to transmit a pair of beams of substantially coherent monochromatic electromagnetic radiation within said first range through said layer in selected regions of said medium so as to form standing waves of interfering radiation through said layer in said regions, the peak energy level of the antinodes of said standing waves being above said certain energy level to alter said transmission and reflection properties of said medium in parallel, spaced surfaces through said layer, so that the pair of interfering radiations forms a periodic structure in said regions of said layer, means to direct a beam of electromagnetic radiation of a wave length within said second range to any of said regions at an angle to be reflected by the spaced surfaces of the periodic structure of the region, means to detect the reflected radiations from said sensitized regions, and means to direct electromagnetic radiation within said third range to any of said regions so as to remove the surfaces of the periodic structures in those regions to restore the sensitized material in said regions to its original unsensitized state, thereby erasing the information recorded in said regions.

* * * * *